US008358438B2

(12) United States Patent
Jackson et al.

(10) Patent No.: US 8,358,438 B2
(45) Date of Patent: Jan. 22, 2013

(54) APPARATUSES AND METHODS FOR AUTOMATIC PRINTING PRESS OPTIMIZATION

(75) Inventors: Bruce Jackson, Middleton, ID (US); Amiran Lavon, Bat Yam (IL); Ehud Chatow, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 917 days.

(21) Appl. No.: 12/295,615

(22) PCT Filed: Apr. 17, 2006

(86) PCT No.: PCT/US2006/014534

§ 371 (c)(1), (2), (4) Date: Apr. 21, 2009

(87) PCT Pub. No.: WO2007/120141

PCT Pub. Date: Oct. 25, 2007

(65) Prior Publication Data

US 2009/0244566 A1 Oct. 1, 2009

(51) Int. Cl.
*G06F 15/00* (2006.01)

(52) U.S. Cl. ........... 358/1.9; 358/406; 358/504; 399/49; 347/264

(58) Field of Classification Search ................... 358/1.9, 358/1.14, 1.15, 2.1, 3.24, 406, 504, 3.06; 399/49, 318, 328; 347/262, 264; 400/76, 400/207, 208, 214
See application file for complete search history.

(56) References Cited

U.S. PATENT DOCUMENTS

| | | | | |
|---|---|---|---|---|
| 5,486,908 | A * | 1/1996 | Miyamoto et al. | 399/328 |
| 5,966,559 | A | 10/1999 | May et al. | |
| 6,099,178 | A * | 8/2000 | Spurr et al. | 400/207 |
| 6,381,423 | B1 | 4/2002 | Eom | |
| 6,389,242 | B1 | 5/2002 | Watanabe | |
| 6,628,316 | B1 * | 9/2003 | Spurr et al. | 346/134 |
| 2002/0083852 | A1 * | 7/2002 | Degani et al. | 101/171 |
| 2002/0085233 | A1 * | 7/2002 | Degani et al. | 358/3.06 |
| 2002/0085234 | A1 * | 7/2002 | VanDuyn et al. | 358/504 |
| 2002/0085235 | A1 * | 7/2002 | Degani et al. | 358/504 |
| 2003/0091351 | A1 | 5/2003 | Weaver et al. | |
| 2003/0177930 | A1 * | 9/2003 | Derhak et al. | 101/484 |
| 2004/0028420 | A1 | 2/2004 | Aslam et al. | |
| 2004/0037602 | A1 * | 2/2004 | Spurr et al. | 400/76 |
| 2004/0175196 | A1 * | 9/2004 | Yamamoto et al. | 399/49 |
| 2004/0190019 | A1 * | 9/2004 | Li et al. | 358/1.9 |
| 2004/0257601 | A1 * | 12/2004 | Tomiyasu et al. | 358/1.9 |
| 2005/0117926 | A1 * | 6/2005 | Tanaka et al. | 399/49 |
| 2005/0117927 | A1 * | 6/2005 | Tanaka et al. | 399/49 |
| 2005/0259276 | A1 * | 11/2005 | Smith et al. | 358/1.9 |
| 2006/0011817 | A1 | 1/2006 | Harush et al. | |

FOREIGN PATENT DOCUMENTS

| | | | |
|---|---|---|---|
| EP | 0911699 | A2 | 4/1999 |
| JP | 2002049249 | A | 2/2002 |

OTHER PUBLICATIONS

PCT Search Report for PCT Application No. PCT/US2006/014534, mailed Sep. 1, 2007 (12 pages).

* cited by examiner

*Primary Examiner* — Kimberly A Williams

(57) ABSTRACT

A method of automatically optimizing a printing apparatus based on media type of a substrate, comprising: (A) inputting a substrate into the printing apparatus; (B) determining the media type of the substrate; (C) automatically adjusting calibration settings according to at least one calibration setting preset, responsive to the determining; and, (D) performing image transfer.

20 Claims, 4 Drawing Sheets

APPARATUSES AND METHODS FOR AUTOMATIC PRINTING PRESS OPTIMIZATION

RELATED APPLICATIONS

This application claims priority to, and is a US National Phase of, International Patent Application No. PCT/US2006/014534, having title "APPARATUSES AND METHODS FOR AUTOMATIC PRINTING PRESS OPTIMIZATION", having been filed on 17 Apr. 2006 and having PCT Publication No. WO2007/120141, commonly assigned herewith, and hereby incorporated by reference.

FIELD OF THE INVENTION

The invention relates to printers and in particular to apparatus and methods of automatically adjusting pressure between rollers that transfer colorant in a printer in order to print an image on the substrate.

BACKGROUND OF THE INVENTION

The quality of the image transfer from an intermediate transfer member ("ITM") to a substrate is sensitive to the pressure between the ITM and the substrate which is governed, inter alia, by the spacing (usually negative spacing) between the undeformed ITM and an impression roller. If contact pressure between the substrate and ITM is too high, the blanket can lose its release capability.

On the other hand, if contact pressure between the ITM and substrate is too low, fixing of the ink to the substrate is marginalized, and blanket contamination can cause early blanket failure. If pressure is not substantially the same for all regions along the nip, a section of the print and blanket can fail for the same reasons as the low and high pressure failures.

In existing printers the (negative) spacing and (indirectly) the pressure between the ITM and the substrate on the impression roller is performed manually. It is known that different pressures are required for different print media depending, depending inter alia on the type of media (material, surface finish, smoothness, coating) to which the image is transferred in second transfer. However, due to the variations in other parameters, such as ITM blanket thickness, in the end, the process of second transfer calibration is essentially a manual one.

SUMMARY OF THE INVENTION

An aspect of some exemplary embodiments of the invention relate to method of automatically optimizing a printing apparatus to account for a print media type being used in conjunction with the printing apparatus. In an exemplary embodiment of the invention, the automatic optimization is performed in response to a media change.

Optionally, the automatic optimization is performed prior to every print. Alternatively or additionally, the automatic optimization is performed according to a predefined schedule. For example, the specific media types to be used in a print job, and at least their number and order, could be preprogrammed into a printing apparatus to make optimizations based on the programmed schedule. Optionally, the calibration schedule is input manually. Optionally, the calibration schedule is input by a controller. In some exemplary embodiments of the invention, a media type sensor is used to verify that the incoming substrate is in compliance with the calibration schedule.

An aspect of some exemplary embodiments of the invention relate to a method of printing a continuous, multiple media type job which is automatically optimized based on the media types being used. Optionally, an optimized print job on multiple types of media is conducted using preset calibration settings for each of the media. Optionally, an optimized print job on multiple types of media is automatically and continuously optimized using feedback during the course of the job. In some exemplary embodiments of the invention, the nip between an image bearing surface and an impression roller is adjusted. Optionally, voltage settings of at least one printing apparatus component are adjusted. Optionally, the temperature of at least one printing apparatus component is adjusted.

An aspect of some embodiments of the invention relates to a method of using pressure sensing and print quality feedback to define at least one preset calibration setting for a media type to be used in a printing apparatus. Optionally, a preset calibration setting for a media type is modified based on feedback data acquired subsequent to setting the preset calibration. In some exemplary embodiments of the invention, preset calibration settings are determined by an external source. Optionally, preset calibration settings are retrieved from a communications network, such as the Internet. In some exemplary embodiments of the invention, a table of preset calibration settings associating at least one media type with at least one calibration setting is created.

In some exemplary embodiments of the invention, preset calibration settings are automatically used by a printing apparatus in a multiple media type print job. In an exemplary embodiment of the invention, media types are differentiated based on gloss level, whiteness-yellow scale, thickness, material and/or surface mapping of the substrate. Optionally, other identifying characteristics of substrates are used to classify media types. In some exemplary embodiments of the invention, gloss level is subdivided into at least 3 levels with each level defining a different media type.

An aspect of some embodiments of the invention relates to providing a printing apparatus capable of automatically adjusting calibration settings using at least one sensor to determine the pressure being exerted on a print media at an image bearing surface to impression roller nip. Optionally, a plurality of sensors is used to determine the pressure being exerted on a print media at an ITM to impression roller nip. In some exemplary embodiments of the invention, at least one sensor is located on the impression roller. Optionally, at least one sensor is located on the ITM. Optionally, sensors are located on the ITM and the impression roller. In some exemplary embodiments of the invention, the at least one sensor is in operational communication with a controller, which is capable of adjusting the pressure exerted by the nip on the print media. Optionally, the at least one sensor is a portion of an automatic printing apparatus optimization system. In some embodiments of the invention, the at least one pressure sensor is situated at the end supports of the impression roller. By having the pressure or force sensors at the end of the supports, the force can be made equal from end to end, in accordance with some exemplary embodiments of the invention.

In some exemplary embodiments of the invention, at least one feedback sensor is provided to a printing apparatus to assist with determining print quality which can then be correlated to a specific calibration setting. Optionally, at least one of these sensors is a densitometer. The use of a gloss sensor to measure the gloss difference between the media and the printed image is an example of one possible print quality measure that can be used. Feedback can be provided by measuring image gloss changes with pressure for purposes of setting the pressure.

In some exemplary embodiments of the invention, the printing apparatus is provided with at least one media sensor which senses the media type of an incoming substrate by sensing such characteristics as gloss level, whiteness-yellow scale, thickness, material and/or surface mapping of the substrate. Alternatively or additionally, the media may be marked with a visible or invisible marking that identifies the media type.

There is thus provided in accordance with an exemplary embodiment of the invention, a method of automatically optimizing a printing apparatus based on media type of a substrate, comprising: (A) inputting a substrate into the printing apparatus; (B) determining the media type of the substrate; (C) automatically adjusting calibration settings according to at least one calibration setting preset, responsive to the determining; and, (D) performing image transfer. In some exemplary embodiments of the invention, the method further comprises repeating (A) to (D) for automatically optimizing a printing apparatus based on media type of the substrate for print jobs involving multiple substrate types. Optionally, determining is performed according to a schedule of expected media. Optionally, the schedule is entered manually by a user of the printing apparatus. Optionally, the schedule is entered automatically by a controller. Optionally, determining comprises indexing a substrate storage bin with a particular media type such that when a substrate is drawn from the bin, the media type is automatically indicated. Optionally, determining comprises scanning a media type identifier which is present on the substrate to sense the media type. Optionally, the media type identifier is a bar code. Optionally, determining comprises sensing a characteristic of the substrate which is associated with a media type. Optionally, an error alert is activated if a sensed media type does not correlate to an expected media type. Optionally, the calibration settings comprise a distance between an intermediate transfer member and an impression roller backing the media to which the image is transferred. Optionally, the calibration settings comprise a pressure at a nip between an intermediate transfer member and an impression backing the media to which the image is transferred. In some exemplary embodiments of the invention, the method further includes sensing pressure directly or indirectly and adjusting a distance between the intermediate transfer member and the impression roller to provide the calibrated pressure. In some exemplary embodiments of the invention, the method further comprises recording the calibration preset in a register or table of calibration presets. In some exemplary embodiments of the invention, the method further comprises performing feedback analysis of a print quality of the image transferred to the substrate. In some exemplary embodiments of the invention, the method further comprises adjusting the calibration setting presets based on the feedback analysis.

There is thus provided in accordance with an exemplary embodiment of the invention, a method of defining at least one preset calibration setting, comprising:

registering a media type of an input substrate; transferring an image to the substrate; measuring a pressure exerted on the substrate at a nip located between an image bearing surface and an impression roller;

analyzing the print quality of the transferred image on the substrate; adjusting at least one calibration setting; repeating at least once a print cycle from the transferring to the adjusting;

comparing results of the print quality analyzing from at least two print cycles to determine a best print quality result; and, setting a calibration preset for the registered media type based on the best determined print quality result.

Optionally, at least one preset calibration setting is retrieved from a communications network. Optionally, at least one preset calibration setting is retrieved from a table of preset calibration settings. Optionally, the setting a calibration preset occurs in a table of preset calibration settings.

There is thus provided in accordance with an exemplary embodiment of the invention, a printing apparatus for automatically adjusting at least one calibration setting based on a media type of an input substrate, comprising:

a controller;

at least one media type sensor in communication with said controller;

an image generator;

an intermediate transfer member downstream of said media sensor, which receives images generated by said image generator;

an impression roller positioned opposite said intermediate transfer member, defining a nip therebetween for transmission of said substrate during image transfer; and, a motor which adjusts the height of said nip in response to commands from said controller.

In some exemplary embodiments of the invention, the apparatus further comprises a pressure sensor which measures the pressure exerted on the substrate at the nip. Optionally, the motor adjusts the height of the nip by moving the intermediate transfer member. Optionally, the motor adjusts the height of the nip by moving the impression roller. Optionally, the calibration setting includes the height of the nip. Optionally, the calibration setting includes the temperature of the intermediate transfer member. Optionally, the calibration setting is derived from a table of calibration settings. Optionally, the calibration setting is derived from a communications network. In some exemplary embodiments of the invention, the apparatus further comprises feedback sensor for determining the print quality of the image transfer. Optionally, the feedback sensor is a densitometer. Optionally, the media type sensor senses at least one of: substrate gloss level, substrate whiteness-yellow scale, substrate thickness, substrate material or surface mapping of the substrate. Optionally, the media type sensor senses a media type identifier. Optionally, the media type identifier is visible. Optionally, the visible media type identifier is a bar code. Optionally, the media type identifier is invisible.

There is further provided, in accordance with an embodiment of the invention, printing apparatus, comprising:

a substrate input; and a controller which receives information regarding a media type of a substrate that is input to the printing apparatus and which automatically adjusts calibration settings of the printing apparatus according to at least one calibration setting preset, responsive to said information.

In an embodiment of the invention, the printing apparatus includes a user input for providing media type of an inputted substrate and which provides said input as media type information to said controller.

Additionally or alternatively, in an embodiment of the invention, the printing apparatus includes a sensor that senses the media type of an inputted substrate and which provides media type information to said controller responsive to said sensing.

Optionally the sensor includes a bar code sensor operative to sense a bar code on said substrate.

Additionally or alternatively, in an embodiment of the invention, the printing apparatus includes a print sequencer which provides said media type information to said controller, based on a scheduled print sequence.

BRIEF DESCRIPTION OF THE DRAWINGS

Exemplary non-limiting embodiments of the invention are described in the following description, read with reference to the figures attached hereto. In the figures, identical and similar structures, elements or parts thereof that appear in more than one figure are generally labeled with the same or similar references in the figures in which they appear. Dimensions of components and features shown in the figures are chosen primarily for convenience and clarity of presentation and are not necessarily to scale. In the attached figures.

DETAILED DESCRIPTION OF EXEMPLARY EMBODIMENTS

Typically, existing printing apparatuses use a calibration setting for the transfer of toner from the image bearing surface to the substrate, depending on the thickness of the media or use a spring to control the force. This calibration instructs the operator to manually set the (generally negative) distance between the image bearing surface and the impression roller to a pre-set calibration distance for that thickness, this distance defining a nip between the two. However, not all print media types respond the same way to this "one size fits all" calibration setting. In general, substantial manual adjustment is necessary to find the optimum second transfer pressure.

In some exemplary embodiments of the invention, the use of a pressure measuring sensor at the nip between an image bearing surface, and an impression roller or at the axes of the impression roller, can lead to better print quality, more reproducible printing, savings in print blanket life due to more effective image transfer, a wider range of media types usable with the printing apparatus and savings in print time and user effort.

Figure 1:
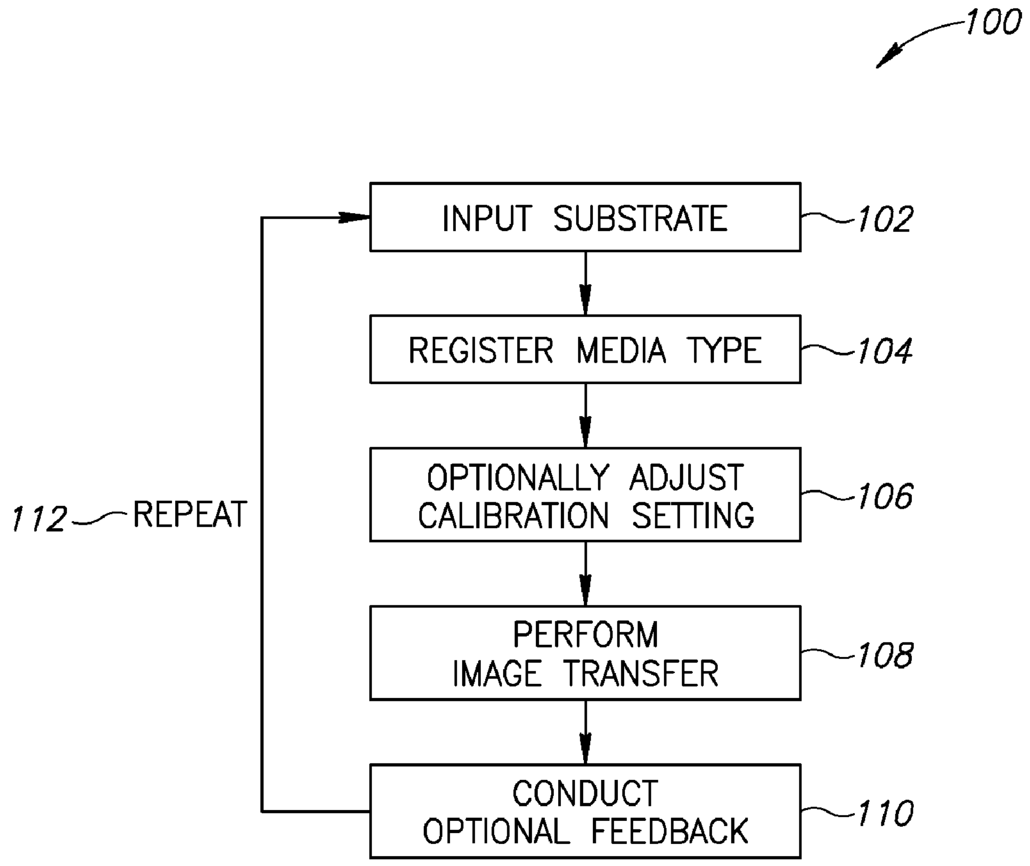
FIG. 1 is a flowchart depicting a method of automatically optimizing a printing press to account for a print media type being used in conjunction with a printing press, in accordance with an embodiment of the invention.
Figure 4:
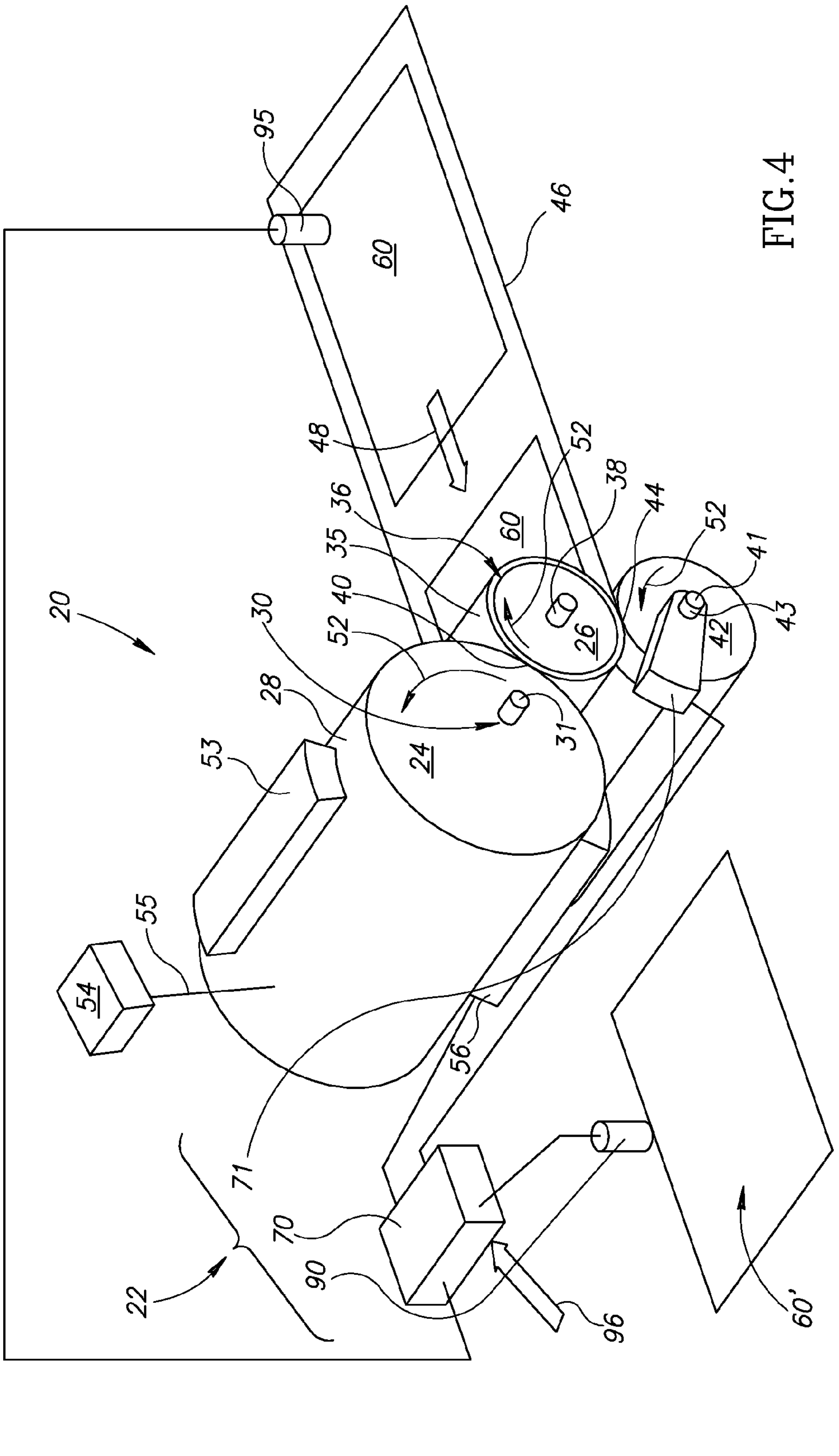

Referring to FIG. 1, a flowchart 100 is shown depicting a method of automatically optimizing a printing press to account for a print media type (including thickness), in accordance with an exemplary embodiment of the invention. A substrate 60, which could be one of a plurality of types of print media, shown in FIG. 4, is input (102) into a generalized printing apparatus 20, shown in FIG. 4. In an exemplary embodiment of the invention, registration (104) is performed manually by a user of printing apparatus 20 inputting the media type into printing apparatus 20. Optionally, registration (104) is performed automatically by printing apparatus 20 by scanning a visible or invisible media type identifier which is present on the media itself. For example, an identifier could be a bar code on a margin or the inverse of the print media which is not to be used for receiving an image. Optionally, known types of print media are placed in and indexed to bins which are known to printing apparatus 20, such that when printing apparatus 20 draws from a specific bin, registration (104) can be performed because it is known to print apparatus 20 what type of media was stored therein. Optionally, media type sensor 95 is used to identify at least one defining characteristic of the input substrate which is then communicated to a controller 70, which correlates the at least one defining characteristic with a media type classification (which is optionally a new classification) and subsequently registers (104) the media type.

Based on the type of media registered (104) by printing apparatus 20, adjustments (106) are made to the calibration settings according to previously set presets. For example, if printing apparatus 20 detects a particular media being input (102), then printing apparatus 20 sets its calibration at the previously determined preset for that media. In an exemplary embodiment of the invention, registration (104) of an input (102) media type occurs with sufficient lead time for printing apparatus 20 to conduct adjustments to the calibration, as described herein.

In some embodiments of the invention, the preset is a distance and the adjustment is performed by calibration adjustment of the relative positions of the axes of the ITM and the impression roller, optionally by motorized adjustment of supports for the impression roller. In some embodiments of the invention, the adjustment is made based on a measured pressure between the rollers, which measurement can be made on the supports of the impression roller or by a pressure sensor underlying the ITM blanket. Optionally, adjustments are made separately to the supports of the impression roller so that the pressure is the same on both supports.

In an exemplary embodiment of the invention, once the appropriate calibration preset has been implemented by printing apparatus 20, image transfer is performed (108) by printing apparatus 20. Optionally subsequent to image transfer (108), feedback (110) is used to analyze print quality at the particular calibration setting that was used. The use of a gloss sensor to measure the gloss difference between the media and the printed image is an example of one possible print quality measure that is optionally used.

In an exemplary embodiment of the invention, automatic adjustments are made to the calibration setting and/or the preset in response to print quality data received from conducting feedback (110). In some exemplary embodiments of the invention, on-the-fly adjustments are made to the calibration setting over the course of a plurality of prints of the print job, with subsequent feedback being used to gauge the relative success of the calibration setting changes. Optionally, the print job being executed by printing apparatus 20 is temporarily halted while trial and error establishment of the optimum preset is conducted, similar to the methodology described below with respect to FIG. 3. The on-the-fly or trial and error adjustment methods are optionally used if a media type is input (102) to printing apparatus 20 which was not previously assigned a preset calibration setting. In multiple impression print jobs, the cycle is repeated (112) for each substrate item input (102) into printing apparatus 20, with optimization optionally occurring prior to each image transfer (108). The use of a gloss sensor to measure the gloss difference between the media and the printed image is an example of one possible print quality measure that can be used. The use of Densitometers is another method which could optionally be used, and in this case the density could optionally be maximized as a function of the adjustable parameter.

Figure 2:
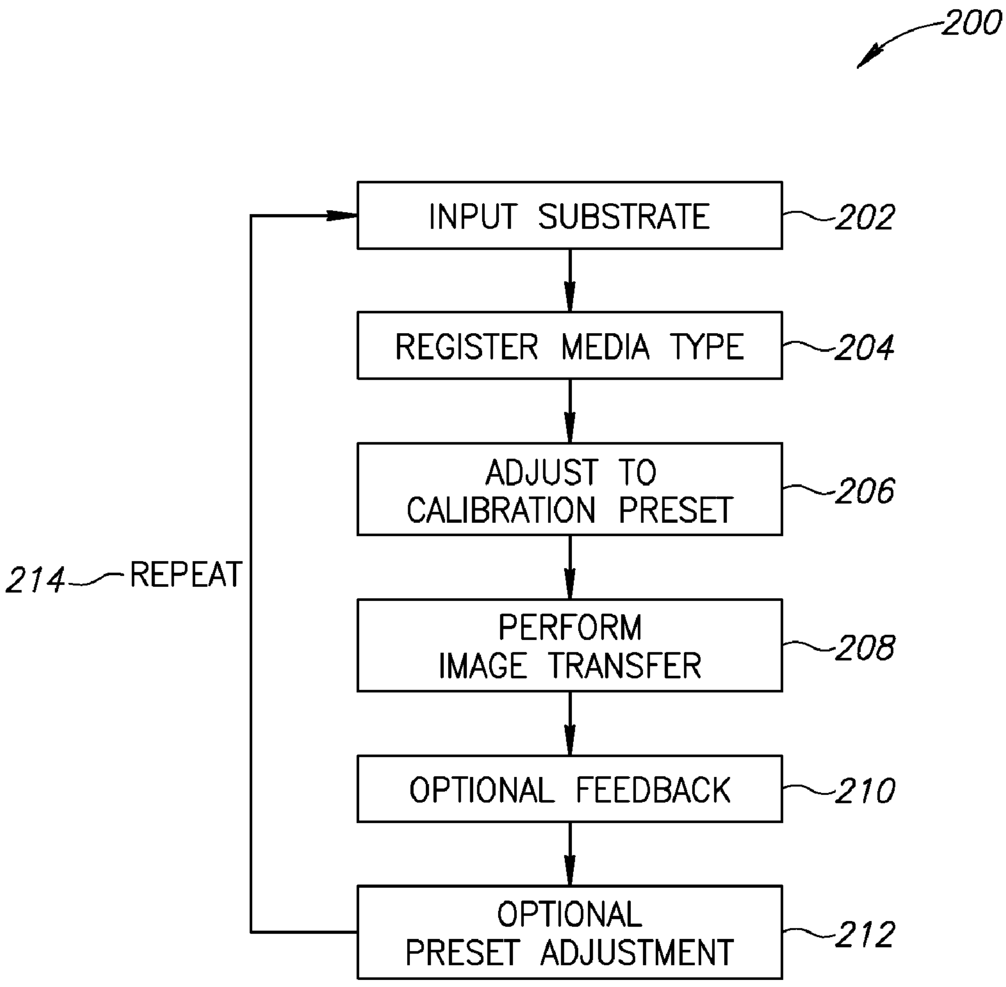
FIG. 2 is a flowchart depicting a method of printing a continuous, multiple media type job which is automatically optimized based on the media types being used, in accordance with an embodiment of the invention.

In an exemplary embodiment of the invention, FIG. 2 shows a flowchart 200 depicting a method of printing a continuous, multiple media type job which is automatically optimized based on the media types being used. In some exemplary embodiments of the invention, a print job can be conducted from beginning to end which is comprised of a plurality of media types for which the printing apparatus calibration settings are optimized for each media type as they are input into the printing apparatus. This could be useful, for example, for printing a complete book whose pages consist of more than one type of media. A substrate is input (202) to printing apparatus 20. In an exemplary embodiment of the invention, printing apparatus registers (204) the media type of the substrate using any of the methods described herein or known in the art. Optionally, the media type of the substrate is previously unknown to printing apparatus 20, and is subsequently registered according to the bin the substrate was drawn from, sensed characteristics of the substrate, manual input and/or a new media type identifier. In an exemplary embodiment of the invention, printing apparatus 20 adjusts (206) itself to a preset calibration setting for the registered (204) media type of the substrate.

In some exemplary embodiments of the invention, printing apparatus 20 is programmed with a calibration schedule which is based on the specific requirements of the print job. For example, if it is known that pages 1-35 are of media type A, and pages 36-40 are of media type B, and pages 41-100 are again media type A, printing apparatus 20 is optionally programmed to automatically use the media type A preset for 35 sheets, then media type B preset for 5 sheets, then media type A preset for 60 sheets. Optionally, the calibration schedule is input manually. Optionally, the calibration schedule is input automatically by controller 70. In some exemplary embodiments of the invention, a media type sensor 95 is used to verify that the incoming substrate is in compliance with the calibration schedule. Optionally, an error signal is activated when a media type sensed by media type sensor 95 does not correlate to the programmed calibration schedule. Image transfer (208) is performed by fixing an image onto the substrate, in an exemplary embodiment of the invention. Optionally, the media type changes more often with single sheets of one media being interleaved with another media.

In some exemplary embodiments of the invention, feedback is optionally used to analyze (210) the print quality of the printed output. Optionally, the preset calibration used to perform the image transfer (208) is adjusted (212) based on the print quality feedback analysis (210). Adjustment (212) to the preset calibration setting is conducted according to methods described herein and in accordance with some exemplary embodiments of the invention, for example as described with respect to FIG. 3. As each substrate item is input (202) into printing apparatus the cycle is repeated (214), with optionally a new preset being used for each new media type and optionally adjusting presets based on feedback analysis of the print quality output. In an exemplary embodiment of the invention, an entire print job, for example a book which is comprised of at least one media type, can be produced in a continuous and automatically optimized fashion. Alternatively, each media type is fed through the printer before the start of the run, calibration is optimized for each media type and these updated calibration pre-sets are used to change the settings on a page by page basis, in accordance with the particular media type being printed.

Figure 3:
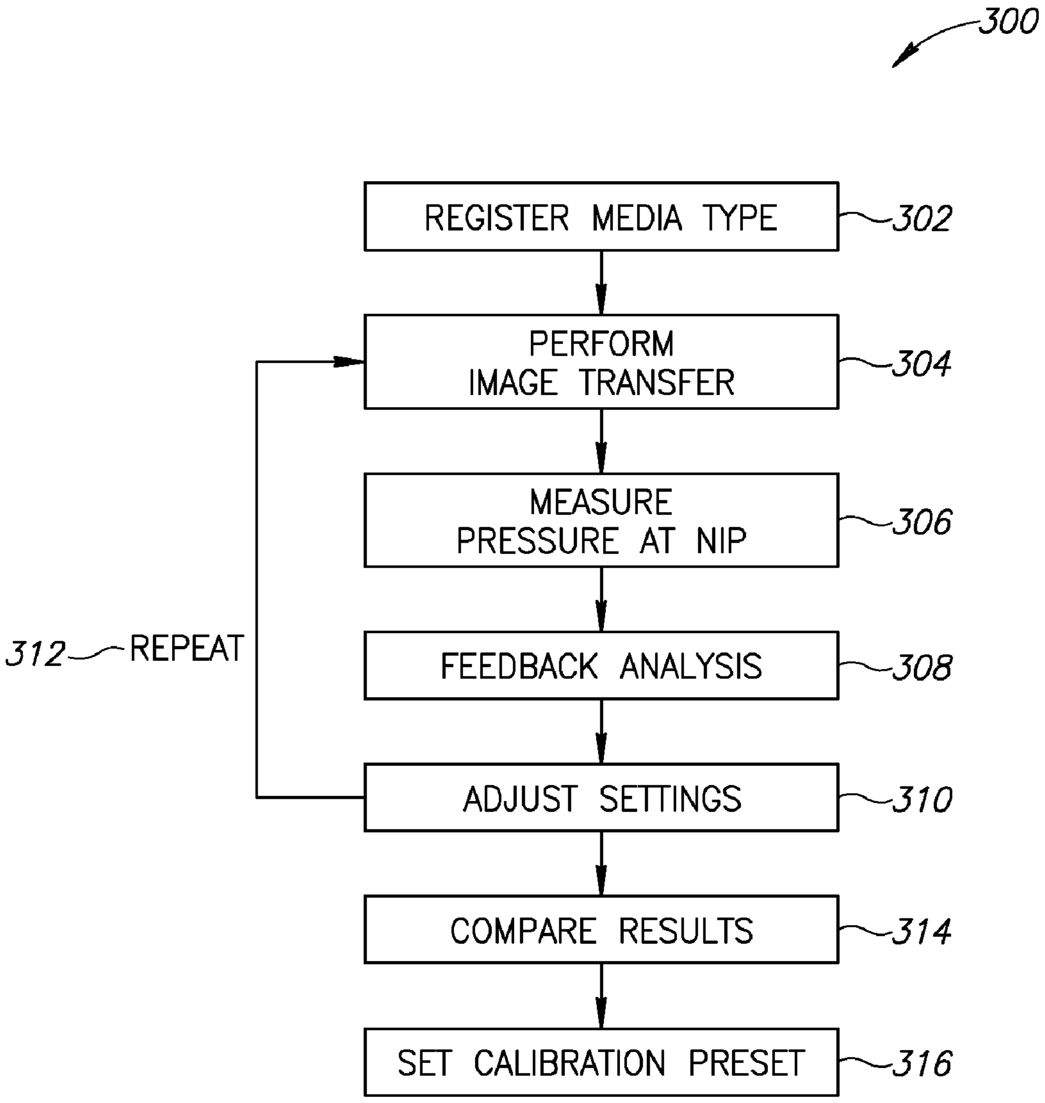
FIG. 3 is a flowchart depicting a method of using pressure sensing and print quality feedback to define at least one preset calibration setting for a media type to be used in a printing press, in accordance with an embodiment of the invention; and, FIG. 4 is a schematic block diagram of a printing apparatus, in accordance with an embodiment of the invention.

Referring now to FIG. 3, a flowchart 300 is provided depicting an exemplary method of using pressure sensing and print quality feedback to define at least one preset calibration setting for a media type to be used in a printing press. In an exemplary embodiment of the invention, media types are differentiated based on gloss level, whiteness-yellow scale, thickness, material and/or surface mapping of the substrate. Optionally, other identifying characteristics of substrates are used to classify media types. In some exemplary embodiments of the invention, gloss level is subdivided into at least 3 levels with each level defining a different media type.

In an exemplary embodiment of the invention, a substrate having a media type is input to printing apparatus 20 and is registered (302) and optionally stored by controller 70 associated with printing apparatus 20. Image transfer (304) is performed as is known in the art, and according to the type of printer, printing press or copier being used as printing apparatus 20. The pressure exerted on substrate 60 at a nip 44 is measured (306) by at least one sensor, in an exemplary embodiment of the invention, for example one of the types indicated above. The measured (306) pressure value is recorded by controller 70 and optionally used to determine the calibration setting. Optionally, subsequent to image transfer (304), the print quality of the transferred image on substrate 60 is measured and then analyzed (308) by controller 70, in an exemplary embodiment of the invention. In some exemplary embodiments of the invention, the gloss and/or the density of the print will change as a function of the temperature and pressure at nip 44, therefore nip 44 is adjusted to maximize the print quality and the adhesion of the ink to substrate 60. Best print quality is optionally associated with the correct density of each of the individual printed colors so that the correct color representation occurs for each color printed. For example, ensuring that the yellow and the cyan are at the correct density to represent the correct color of green for a lawn. The analyzed (308) quality of the print is associated, in a database for example, with the measured (306) pressure value. Optionally, a table associating print quality, pressure values and/or calibration settings is created for reference. Optionally, the table is used by printing apparatus 20 to perform calibration setting optimization during printing. In an exemplary embodiment of the invention, the calibration settings (e.g. the height of nip 44) are adjusted (310) prior to the commencement of another print cycle beginning at image transfer (304).

The print cycle is repeated (312) at the new calibration settings and a pressure measurement is made and the print quality is analyzed, as described above. These print quality results are compared (314) to at least one of the results acquired in previous print cycles. In some exemplary embodiments of the invention, if it appears that print quality is getting better, progressive adjustments (310) are made to the calibration settings in the same direction that proved to indicate improving results, until print quality seems to diminish. In contrast, if print quality appears to be decreasing, calibration settings are optionally made in a direction opposite to that which indicated decreasing print quality at which point the setting a calibration preset process returns to the "print quality is getting better" procedure. In some exemplary embodiments of the invention, movement of the calibration settings in both directions provides diminishing print quality. Such an instance typically indicates that the original calibration setting was the optimum. In some exemplary embodiments of the invention, ITM 26 temperature settings are also included in calibration settings. In some exemplary embodiments of the invention, ITM 26 temperature is slowly changed over the course of a print job in order to optimize print quality. Optionally, voltage settings of various printing apparatus 20 components (e.g. photoreceptor 24/ITM 26) are included in calibration settings. Optionally, ITM 26 temperature and/or voltage are adjustably controlled in combination with the width of nip 44 in order to determine optimum preset calibration settings. After trial and error repetition of the print cycle and comparison of the results, a calibration preset for the registered (302) media type is reset (316) according to the best determined print quality results.

FIG. 4 schematically shows a digital printer 20 comprising pressure adjusting apparatus (PAA) 22 for automatically adjusting pressure between an impression roller 42 and an intermediate transfer member (ITM) 26 comprised in the printer, in accordance with an embodiment of the present invention. FIG. 4 shows only elements and features of digital printer 20 that are germane to the discussion. Features and elements other than those shown in FIG. 4 may be present in the printer, and as various layouts and constructional features for printers are known in the art and the present invention is applicable to many types of printers, the printer may be different from that shown.

The printer includes a PIC 24 with a photoconductor surface 28 and is optionally supported on a shaft 30 having ends 31 and 32, which is mounted to a suitable support frame (not shown) of printer 20. ITM 26 has a transfer surface, optionally a surface 35 of a removable printing blanket 36, and is optionally supported on a shaft 38 mounted to the printer support frame. Similarly, an impression roller 42 is optionally supported on a shaft 43 mounted on the printer frame.

Photoconductor surface 28 and surface 35 of ITM 26 contact each other along a nip 40. Impression roller 42 is mounted to the printer support frame so that it presses against ITM 26 along a nip 44. A conveyor (shown very schematically at 46) feeds unprinted substrate media sheets, for printing to nip 44 in a "printing direction" indicated by a block arrow 48 and sheets 60' printed by the printer are transported away from nip 44 by a conveyor (not shown). Arrows 52 indicate directions in which PIC, ITM and impression roller 34 rotate during printing.

In the printing process, as PIC rotates, a charger 53 charges photoconductor surface 28 so that it has a substantially uniform surface charge density. A laser unit 54 comprising a laser (not shown) and associated optics (not shown) scans a laser beam 55 over photoconductor surface 28 as it rotates to discharge regions of the photoconductor surface and generate a latent image (not shown) of charged and uncharged pixels on the photoconductor surface responsive to an image to be printed on paper sheets 60. A developer 56 applies toner of suitable color to, optionally, the charged pixels in the latent image as the latent image passes beneath the developer. The toner is transferred from the latent image to blanket 36 of ITM 26 at nip 40 between the PIC and the ITM. Toner is subsequently transferred from the blanket to a sheet of paper 60 fed to nip 44 between ITM 26 and impression roller 42 by conveyor 46 as the sheet passes through the nip to print the image on the paper.

As noted in the above referenced application Ser. No. 10/890,614, transfer of toner from ITM 26 to sheet 60 is sensitive to pressure between ITM 26 and sheet 60 at nip 44.

For adjusting pressure between ITM 26 and impression roller 42 along their nip 44, PAA 22 optionally comprises a controller 70, at least one densitometer and an actuator or motor, hereinafter, generically, a proximal motor 71, coupled to end 41 of shaft 43 and a distal motor (not shown) coupled to the hidden end of the shaft.

Each motor (proximal 71 and distal) is optionally independently controlled by controller 70 and is coupled to shaft 43 near its respective shaft ends, so that controller 70 can control each motor to move the shaft end to which it is coupled selectively towards or away from shaft 38 that supports ITM 26. Any of various methods and devices known in the art may be used to couple proximal motor 71 and the distal motor to the shaft ends. Controller 70 can therefore selectively increase or decrease pressure between ITM 26 and sheet 60 along nip 44 by controlling proximal motor 71 and the distal motor to move the ends of shaft 43 respectively towards or away from shaft 38.

Since proximal motor 71 and the distal motor are, optionally, controlled independently of each other, controller 70 can control the motors to move their respective shaft ends by different amounts and/or, selectively, in opposite directions towards or away from ITM shaft 38. As a result, not only can controller 70 increase or decrease pressure between ITM 26 and impression roller 42, but can operate the motors so that pressure between the ITM and impression roller in regions of nip 44 near the ends of shaft 30 is substantially the same. Controller 70 can thereby substantially equalize pressure between the ITM and impression roller at points along their nip 44.

In an exemplary embodiment of the invention, at least one media type sensor 95 is provided to printing apparatus 20. Optionally, at least one media type sensor 95 is located near where substrate 60 enters printing apparatus 20. Optionally, at least one media type sensor 95 is located prior to nip 44. In an exemplary embodiment of the invention, at least one media type sensor 95 is in operative communication to controller 70. In some exemplary embodiments of the invention, media type sensor 95 is adapted to sense characteristics of an incoming substrate, including whiteness, gloss and/or substrate fiber type. Optionally, upon sensing at least one incoming substrate characteristic, media type sensor 95 communicates with controller 70 to report the sensed characteristic. Alternatively or additionally his sensor optionally measures a characteristic of the media or reads a bar code that is present on the media. Optionally, as described above, data on the media is supplied to controller 70 as described above. This data is transported via a bus shown schematically at 96.

Based on knowledge of the media type and optionally based on feedback from the pressure sensors, controller 70 determines by how much and in what direction (towards or away from shaft 38) to move each shaft end of shaft 43 responsive to the preset calibration values as described above and on measurements or other data that define the media as described above.

It is noted that a structure similar to that shown in FIG. 4 as being mounted on shaft 43 may be mounted on shaft 30 for adjusting the pressure between the PIP and ITM at their nip 40. This is described in detail in the aforementioned U.S. patent application Ser. No. 10/890,614.

In an exemplary embodiment of the invention, at least one feedback sensor 90 is provided to printing apparatus 20 for determining the quality of the prints being made by printing apparatus 20.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the disclosure and/or claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents, which perform the same function, even if the structure or acts are different, as known in the art. Therefore, the scope of the invention is limited only by the elements and limitations as used in the claims.

The invention claimed is:

1. A method of automatically optimizing a printing apparatus based on media type of a substrate, comprising:

(A) detecting that a substrate has been input into said printing apparatus;

(B) determining the media type of said substrate;

(C) automatically adjusting calibration settings according to at least one calibration setting preset, responsive to said determining;

(D) performing image transfer; and (E) defining said at least one calibration setting by registering said media type of said substrate, transferring an image to said substrate, measuring a pressure exerted on said substrate at a nip located between said image bearing surface and an impression roller, analyzing a print quality of a transferred image on said substrate, repeating at least once a print cycle from said transferring to said adjusting, comparing results of print quality analysis from at least two print cycles to determine a best print quality result, and setting said at least one calibration setting for a registered media type based on said determined best print quality result.

2. A method according to claim 1, further comprising repeating (A) to (D) for automatically optimizing a printing apparatus based on media type of said substrate for print jobs involving multiple substrate types.

3. A method according to claim 1, wherein determining is performed according to a schedule of expected media.

4. A method according to claim 1, wherein determining comprises indexing a substrate storage bin with a particular media type such that when a substrate is drawn from said bin, said media type is automatically indicated.

5. A method according to claim 1, wherein determining comprises scanning a media type identifier which is present on the substrate to sense the media type.

6. A method according to claim 1, wherein determining comprises sensing a characteristic of the substrate which is associated with a media type.

7. A method according to claim 1, wherein the calibration settings comprise a distance between an intermediate transfer member and an impression roller backing the media to which the image is transferred.

8. A method according to claim 1, wherein the calibration settings comprise a pressure at a nip between an intermediate transfer member and an impression backing the media to which the image is transferred.

9. A method according to claim 8 and including sensing pressure directly or indirectly and adjusting a distance between the intermediate transfer member and the impression roller to provide the calibrated pressure.

10. A method according to claim 1, further comprising performing feedback analysis of a print quality of said image transferred to said substrate.

11. A method according to claim 10, further comprising adjusting said calibration setting presets based on said feedback analysis.

12. A method of defining at least one preset calibration setting, comprising:

registering a media type of an input substrate;

transferring an image to said substrate;

measuring a pressure exerted on said substrate at a nip located between an image bearing surface and an impression roller;

analyzing the print quality of the transferred image on said substrate;

adjusting at least one calibration setting;

repeating, at least once, a print cycle from said transferring to said adjusting;

comparing results of said print quality analyzing from at least two print cycles to determine a best print quality result; and setting a calibration preset for the registered media type based on said best determined print quality result.

13. A printing apparatus for automatically adjusting at least one calibration setting based on a media type of an input substrate, comprising:

a controller to automatically adjust the at least one calibration setting according to at least one calibration setting preset, based on the media type of the input substrate;

at least one media type sensor in communication with said controller;

an image generator;

an intermediate transfer member downstream of said media sensor, which receives images generated by said image generator;

an impression roller positioned opposite said intermediate transfer member, defining a nip therebetween for transmission of said substrate during image transfer; and, a motor which adjusts the height of said nip in response to commands from said controller, wherein said controller is to define said at least one calibration setting by registering said media type of said substrate, transferring an image to said substrate, measuring a pressure exerted on said substrate at a nip located between said image bearing surface and an impression roller, analyzing a print quality of a transferred image on said substrate, repeating at least once a print cycle from said transferring to said adjusting, comparing results of print quality analysis from at least two print cycles to determine a best print quality result and setting said at least one calibration setting for a registered media type based on said determined best print quality result.

14. A printing apparatus according to claim 13, further comprising a pressure sensor which measures the pressure exerted on said substrate at the nip.

15. A printing apparatus according to claim 13, wherein said motor adjusts the height of the nip by moving at least one of the intermediate transfer member or the impression roller.

16. A printing apparatus according to claim 13, wherein said calibration setting includes the height of the nip.

17. A printing apparatus according to claim 13, wherein said calibration setting includes the temperature of the intermediate transfer member.

18. A printing apparatus according to claim 13, further comprising feedback sensor for determining the print quality of said image transfer.

19. A printing apparatus according to claim 13, wherein said media type sensor senses at least one of: substrate gloss level, substrate whiteness-yellow scale, substrate thickness, substrate material or surface mapping of the substrate.

20. A printing apparatus according to claim 13, wherein said media type sensor senses a media type identifier.

* * * * *

UNITED STATES PATENT AND TRADEMARK OFFICE

CERTIFICATE OF CORRECTION

PATENT NO. : 8,358,438 B2
APPLICATION NO. : 12/295615
DATED : January 22, 2013
INVENTOR(S) : Bruce Jackson et al.

It is certified that error appears in the above-identified patent and that said Letters Patent is hereby corrected as shown below:

In the Claims:

In column 12, line 42, in Claim 13, delete "result" and insert -- result, --, therefor.

Signed and Sealed this
Twenty-third Day of April, 2013

Teresa Stanek Rea
*Acting Director of the United States Patent and Trademark Office*